United States Patent [19]
Yamauchi

[11] Patent Number: 5,751,604
[45] Date of Patent: May 12, 1998

[54] COGENERATION SYSTEM

[75] Inventor: Noriyuki Yamauchi, Hyogo-ken, Japan

[73] Assignee: Terasaki Denki Sangyo Kabushiki Kaisha, Osaka, Japan

[21] Appl. No.: 9,200

[22] Filed: Jan. 26, 1993

[30] Foreign Application Priority Data

Feb. 3, 1992 [JP] Japan ................................ 4-017605

[51] Int. Cl.$^6$ .................................................. G06F 17/00
[52] U.S. Cl. .................................................. 364/494
[58] Field of Search ........................ 364/494, 148, 364/152, 492, 481; 60/648, 645, 660

[56] References Cited

U.S. PATENT DOCUMENTS 4,628,462  12/1986  Putman ................................ 364/494
4,802,100   1/1989  Aasen et al. ......................... 364/494

FOREIGN PATENT DOCUMENTS

4302900A1  8/1993  Germany.

OTHER PUBLICATIONS

K. Jensch, et al. "Die Blockheizkraftwerkstechnik und ihr Beitrag zur rationellen Energienutzung", Brennst.Warme-Kraft 31, No. 11, Nov. 1979, pp. 424–429.

G. Schollhammer et al. "Motor–Motion" published in Energie, 35th Annual Set, No. 11, Nov. 1983, pp. 309–312, with translation of page 301, column 2, second paragraph to column 3, first paragraph.

*Primary Examiner*—James P. Trammell
*Assistant Examiner*—Craig S. Miller
*Attorney, Agent, or Firm*—Lowe, Price, LeBlanc & Becker

[57] ABSTRACT

A load value of an external load is detected by a load value detector. When a heat quantity recovered by a heat load from a heat engine or a fuel cell is smaller than a predetermined value, a CPU calculates electric power to be consumed by an electric heater based on a relation between a heat value of heat load relative to a load value of a generator or fuel cell and a heat quantity recovered from generator or fuel cell stored in a memory of a power setting unit, so that the sum of heat quantities recovered from waste heat of heat engine or fuel cell and from generated heat of electric heater by heat load is the predetermined value, thereby controlling electric heater according to the result.

8 Claims, 4 Drawing Sheets

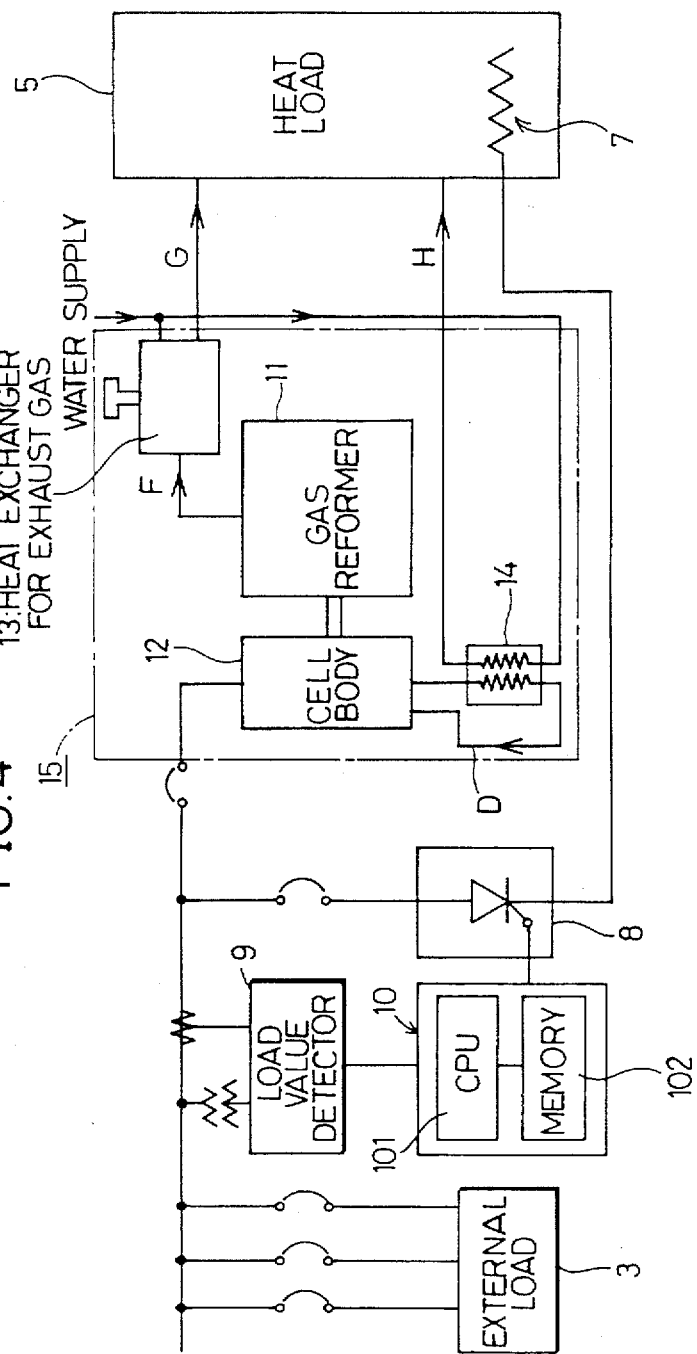

COGENERATION SYSTEM

BACKGROUND OF THE INVENTION

1. Field of the Invention

The present invention relates to a cogeneration system (hereinafter referred to as CGS), and more specifically to a CGS achievable of energy conservation by supplying heat loads with waste heat in exhaust gas and cooling water of a high temperature generated from heat engines or fuel cells.

2. Description of the Background Art

A temperature of exhaust gas generated from a heat engine of a CGS usually becomes 500° C. or more, and a waste heat temperature of cooling water of the heat engine becomes 85° C. or more. A fuel cell generates exhaust gas and cooling water of a high temperature, since it is a system which directly obtains electrical energy from fuel utilizing chemical reaction. In a CGS with a purpose of energy conservation, the waste heat in exhaust gas and cooling water of a high temperature should be effectively utilized in a stable condition. A heat quantity which can be recovered by a heat load from waste heat discharged by a heat engine driving a generator or a fuel cell in order to obtain electric power is usually approximately proportional to the electric power generated by the generator or the fuel cell.

Therefore, efficient operation can be performed, when the heat quantity recovered from the heat engine or the fuel cell at generation of required electric power by the electric power load is equal to that required for the heat load. The efficient operation, however, is actually difficult to be carried out, because these heat quantities are not equal in most cases and both of the load values have a possibility to fluctuate. When an electric power load value is less than a prescribed value, the heat load does not function sufficiently because of a small quantity of waste heat supplied to the heat load. In such a case, a compensation method in which a dummy load is connected to a terminal of the generator or the fuel cell for increasing an electric power load value and thus the quantity of waste heat, or a method in which a heat source except a CGS, for example an auxiliary boiler, can be applied.

According to these compensation methods, electric power consumed by the dummy load is wastage in the former case, and equipment and management costs of the auxiliary boiler are further required in the latter case. Additionally when the quantity of waste heat from the heat engine or the fuel cell is small, temperature measurement of waste heat and heat load can be applied to control of dummy load. In this case, however, a problem arises that the heat load can not operate stably because of a time delay before the dummy load operates, especially in the case when the electric power load value has changed suddenly.

SUMMARY OF THE INVENTION

An object of the present invention is to provide a cogeneration system in which, when the quantity of waste heat generated from a heat engine driving a generator or a full cell is deficient with respect to a load value required for external electric power, the deficiency of the heat quantity can be compensated for with less loss, as well as a heat load can be operated in a stable condition, with quick response to possible fluctuation of the load value of the external electric power.

In a cogeneration system in accordance with the present invention, when a load value of an external electric power load is small, and a heat quantity recovered by a heat load from a heat engine or a fuel cell is smaller than a prescribed value, a heat quantity generated by the operation of heat generating means connected to a generator or the fuel cell and an increased heat quantity of waste heat from the heat engine or the fuel cell having its output increased by the operation of the heat generating means compensate for the deficiency. In the compensation method, a load value of the external electric power load is detected by detecting means for detecting the same; electric power to be consumed in the heat generating means is calculated from the relation which stored in controlling means for controlling the heat generating means between a load value of the generator or the fuel cell and a heat quantity recovered by the heat load from the heat engine or the fuel cell, so that the sum of the heat quantities recovered by the heat load from waste heat of the heat engine or the fuel cell and from generated heat of the heat generating means is equal to a predetermined value; and the heat generating means is controlled according to the result.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a schematic diagram showing a structure of another embodiment of the present invention.

DESCRIPTION OF THE PREFERRED EMBODIMENTS

Figure 1:
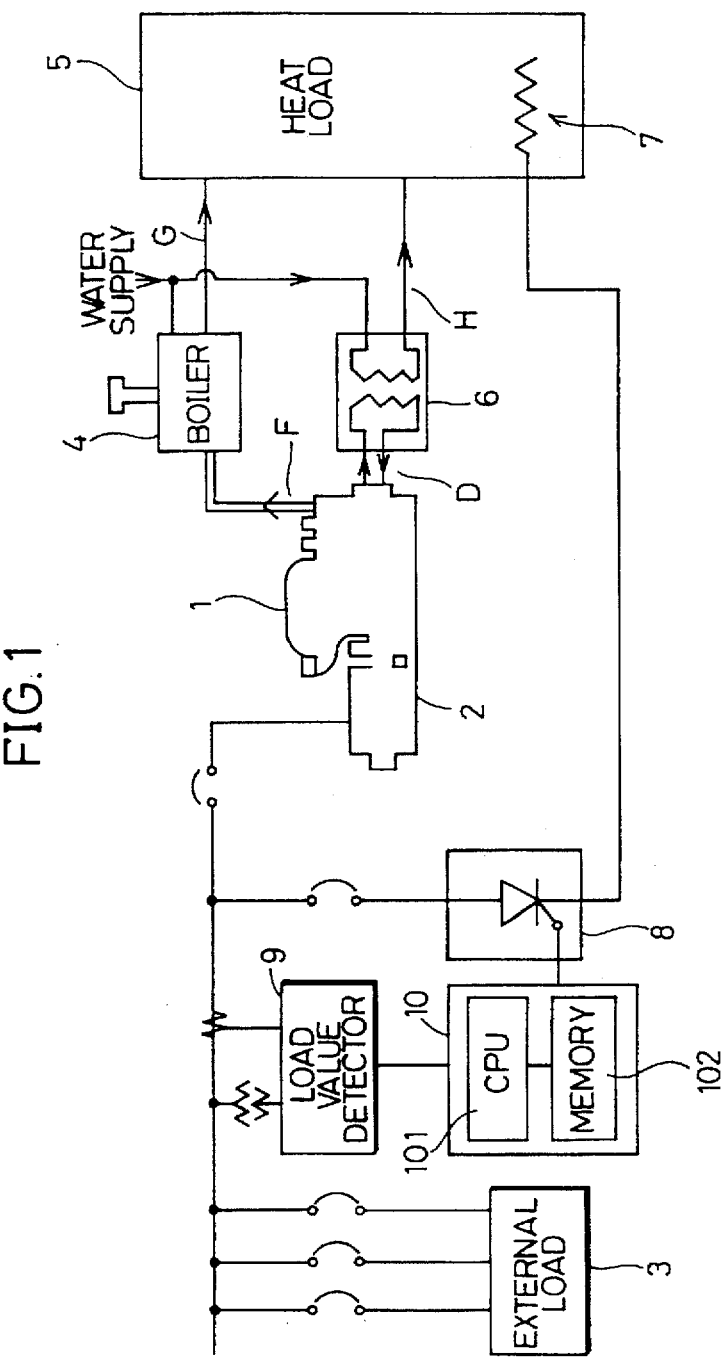
FIG. 1 is a schematic diagram showing a structure of one embodiment of the present invention.
Figure 2:
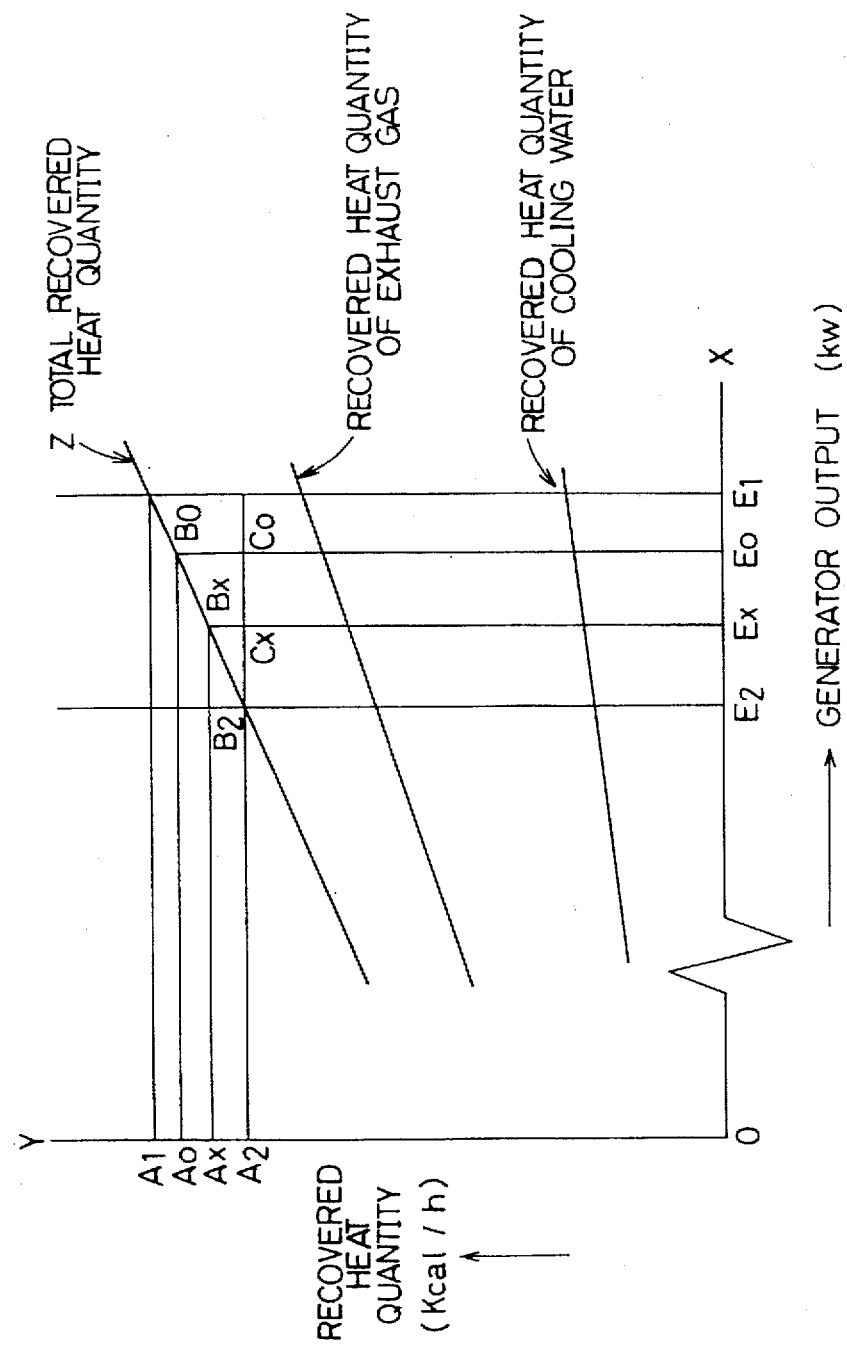
FIG. 2 is a graph showing the relation between an output of a generator 2 and a heat quantity recovered by a heat load 5 from a heat engine.

FIG. 1 is a schematic diagram showing one embodiment of the present invention, and FIG. 2 is a graph showing the relation between an output of a generator and a heat quantity recovered by a heat load from a heat engine.

Referring to FIG. 1, a heat engine 1, which is a Diesel engine, drives a generator 2 to generate electric power and apply the same to an external load 3. At this time, heat engine 1 generates the output proportional to the generated electric power, and exhaust gas F and circulating cooling water D having a corresponding heat quantity. Exhaust gas F of heat engine 1 is supplied to a boiler 4, and hot water G is produced therein, which is then supplied to a heat load 5. The heat of circulating cooling water D passes through the primary side of a heat exchanger 6, while hot water H is supplied from the secondary side to the heat load 5. A hot-water supplier, for example, can be used as heat load 5.

External load 3 and an electric heater 7 are connected to an output terminal of generator 2 as electric power load. An automatic voltage regulator 8 for regulating electric heater 7, and a load value detector 9 for external load 3 and a power setting unit 10 giving a command of output to automatic voltage regulator 8 are also connected to the output terminal of generator 2, as controllers. Power setting unit 10 includes a CPU 101 and a memory 102. A heat quantity generated in electric heater 7 is supplied to heat load 5.

Though, illustration is not indicated on FIG. 1, electric heater 7 can be installed in exhaust gas F and/or hot water H respectively, so that the generated heat from electric heater 7 shall be finally supplied to heat load 5.

Power setting unit 10 operates when a load value of external load 3 is less than a prescribed value $E_0$kW. The prescribed value $E_0$kW corresponds to an output of the generator required for recovering a heat quantity $A_0$kcal/h required for heat load 5 from heat engine 1, and it corresponds to an electric power load value of external load 3 when electric heater 7 is not operated. In memory 102 included in power setting unit 10, an expression of a straight line Z shown in FIG. 2 is stored in advance as the relation between an output of generator 2 and a heat quantity recovered by heat load 5 from heat engine 1, with heat loss considered. It is because an output of the generator is usually approximately proportional to a heat quantity recovered by the heat load from the heat engine such as a Diesel engine.

Figure 3:
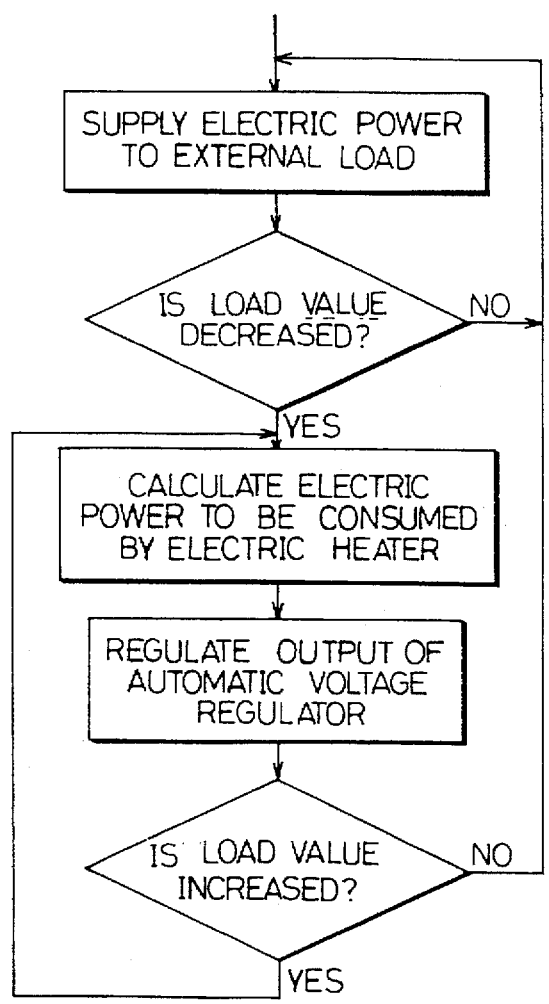
FIG. 3 is a flow chart showing the operation of one embodiment of the present invention.

FIG. 3 is a flow chart showing the operation of one embodiment of the present invention. Referring to FIGS. 1 and 3, specific operation of one embodiment of the present invention will be hereinafter described. Heat engine 1 is operated to supply a required electric power $E_1$kW from generator 2 to external load 3, while heat load 5 can recover from heat engine 1 a heat quantity $A_1$kcal/h which exceeds the heat quantity $A_0$kcal/h required for itself. The excess heat is accumulated in a heat accumulator, not shown, or is directly discharged, depending on the case. When a load value of the external load in this condition decreases and thus an output of generator 2 decreases to $E_2$kW ($<E_0$kW), the heat quantity recovered by heat load 5 from heat engine 1 decreases to $A_2$kcal/h ($<A_0$kcal/h). Therefore, a heat quantity ($A_0-A_2$) kcal/h should be compensated for, in heat load 5.

Power setting unit 10 included in CPU 101 receives through load value detector 9 information of a load value lower than $E_0$kW determined as in the following to operate electric heater 7. When the total output of generator 2 is $E_X$kW and a heat quantity recovered by heat load 5 from heat engine 1 is $A_X$kcal/h at the operation of electric heater 7, heat load 5 should recover a heat quantity of ($A_0-A_X$)kcal/h from electric heater 7. Electric power to be consumed by electric heater ($E_X-E_2$)kW which satisfies this condition is determined by calculating the following expression (1) by CPU 101 included in power setting unit 10, so that an output of automatic voltage regulator 8 is regulated.

$$E_X-E_2=\{(A_0-A_2)(E_0-E_2)\}/\{860(E_0-E_2)+(A_0-A_2)\} \quad (1)$$

The above expression (1) is provided from the following expressions (2) and (3). In FIG. 2, an axis X shows an output of the generator, an axis Y shows a heat quantity recovered by heat load 5 from heat engine 1, intersections of straight lines $X=E_0$, $X=E_2$ and $X=E_X$ with a straight line Z are $B_0$, $B_2$ and $B_X$, respectively, and intersections of straight lines $X=E_0$, $X=E_X$ with a straight line $Y=A_2$ are $C_0$ and $C_X$, respectively.

Since a relation $B_XC_X/B_2C_X=B_0C_0/B_2C_0$ holds in $\Delta B_2B_XC_X$ and $\Delta B_2B_0C_0$, the following expression (2) is obtained by substitutions of $B_XC_X=A_X-A_2$, $B_2C_X=E_X-E_2$, $B_0C_0=A_0-A_2$, and $B_2C_0=E_0-E_2$.

$$(A_X-A_2)/(E_X-E_2)=(A_0-A_2)/(E_0-E_2) \quad (2)$$

In addition, since a heat quantity ($A_0-A_2$) kcal/h for which heat load 5 is compensated is equal to the sum of an increase of a heat quantity ($A_X-A_2$) kcal/h of waste heat recovered from heat engine 1 by heat load 5 through the operation of electric heater 7 and a heat quantity 860 ($E_X-E_2$) kcal/h of generated heat in electric heater 7, the following expression (3) is provided.

$$A_0-A_2=(A_X-A_2)+860(E_X-E_2) \quad (3)$$

where a heat quantity per 1 kW is 860 kcal/h.

Although the case where a load value of external load 3 is decreased and a heat quantity required for heat load 5 can not be obtained from heat engine 1 has been described above, it is expected that an elaborate operation is possible by regulating consumed electric power of electric heater 7, also in the case where a load value of the external load in this condition increases conversely, as well as in the case a load value of external load 3 is smaller than $E_0$kW at the beginning of this system.

The heat quantity $A_0$kcal/h required for heat load 5 can be changed as required.

In this embodiment, it is assumed that an output of generator 2 is proportional to a heat quantity recovered by heat load 5 from heat engine 1 with heat loss considered, and thus the relation is stored in memory 102 of the computer in the form of the expression of the straight line Z shown in FIG. 2. Even when the relation is not proportional, data of the relation can be stored in memory 102 and obtained by calculating or searching an optimum value. Waste heat of heat engine 1 and generated heat of electric heater 7 can be reasonably utilized by operating electric heater 7 under the condition thus determined.

Although, in this embodiment, the heat engine used is of the type which requires cooling water, such as a Diesel engine, a heat engine of the type which does not require cooling water, such as a gas turbine, can also be applied.

FIG. 4 is a schematic diagram showing another embodiment of the present invention. In the embodiment shown in FIG. 4, a fuel cell 15 is provided in place of heat engine 1 and generator 2 shown in FIG. 1. Fuel cell 15 consists of a gas reformer 11 for separating hydrogen gas from fuel, a cell body 12 for generating electric power through chemical reaction of the separated hydrogen gas and oxygen, a heat exchanger for exhaust gas 13, and a heat exchanger for cooling water 14, and they are installed in the same box or separately depending on location etc. Exhaust gas F and circulating cooling water D having a heat quantity proportional to generated electric power are generated from fuel cell 15. Exhaust gas F of fuel cell 15 is supplied to heat exchanger for exhaust gas 13, where hot water G is produced to be supplied to heat load 5. The heat of circulating cooling water D passes through the primary side of heat exchanger for cooling water 14, and hot water H is supplied from the secondary side to heat load 5. Exhaust gas F is exhaust of a high temperature gas used in the separation of hydrogen gas from fuel, and circulating cooling water D is used in cooling of cell body 12 heated by chemical reaction or cooling of the hydrogen gas separated at a high temperature.

As in the same manner as FIG. 1, external load 3 and electric heater 7 are connected to an output terminal of fuel cell 15 as electric power loads. Automatic voltage regulator 8 for regulating electric heater 7, load value detector 9 for external load 3 and power setting unit 10 including CPU 101 and memory 102 therein for giving a command of output are also connected thereto as controllers. A heat quantity generated in electric heater 7 is supplied to heat load 5.

Though illustration is not indicated on FIG. 4, electric heater 7 can be installed in exhaust gas F and/or hot water H respectively, so that the generated heat from electric heater 7 shall be finally supplied to heat load 5.

In the CGS employing fuel cell 15 with the above structure, as well as in the embodiment of FIG. 1, it is assumed that an output of fuel cell 15 is proportional to a heat quantity recovered by heat load 5 from fuel cell 15 with heat loss considered, and thus the relation is stored in memory 102 of the computer in the form of the expression of the straight line Z shown in FIG. 2. Even when the relation is not proportional, data of the relation can be stored in memory 102, and obtained by calculating or searching an optimum value. Waste heat from fuel cell 15 and generated heat in electric heater 7 can be reasonably utilized by operating electric heater 7 under the condition thus determined.

As described above, according to the embodiment of the present invention, a heat load can be supplied with heat with less loss in a stable condition even when a required amount of electric power load value and that of heat load value in a CGS are not equal, accomplishing the purpose of energy conservation. In addition, even when an electric power load value has changed suddenly, it is quickly compensated, enabling the operation in a stable condition without fluctuation of a heat load value.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cogeneration system including a generator driven by a heat engine, an external electric power load connected to said generator, and a heat load whose heat source is, waste heat generated from said heat engine, comprising:

detecting means for detecting a load value of said external electric power load;

heat generating means powered by said generator for generating heat and supplying the generated heat to said heat load; and controlling means for controlling said heat generating means according to the load value of said external electric power load detected by said detecting means, said controlling means comprising
      storing means for storing information indicating a relation between a load value of said generator and a heat quantity recovered by said heat load from said heat engine, and
      calculating means for calculating electric power to be consumed by said heat generating means based on the relation stored in said storing means, so that the sum of heat quantities recovered by said heat load from waste heat of said heat engine and from generated heat of said heat generating means is a predetermined value, in response to said external electric power load being a small load value and a heat quantity recovered by said heat load from said heat engine being less than the predetermined value.

2. The cogeneration system according to claim 1, wherein said controlling means comprises voltage regulating means for regulating a voltage applied from said generator to said heat generating means according to a calculated result by said calculating means.

3. The cogeneration system according to claim 1, wherein said heat engine is cooled by cooling water, and comprises a heat exchanger for supplying said heat load with heat of cooling water heated by said heat engine.

4. The cogeneration system according to claim 1, wherein said heat engine generates exhaust gas, and comprises an exhaust boiler for supplying said heat load with heat energy of steam or hot water heated by said heat engine.

5. A cogeneration system including a fuel cell, an external electric power load connected to said fuel cell, and a heat load whose heat source is waste heat generated by said fuel cell, comprising:

detecting means for detecting a load value of said external electric power load;

heat generating means powered by said fuel cell for generating heat and supplying the generated heat to said heat load; and controlling means for controlling said heat generating means according to the load value of said external electric power load detected by said detecting means, said controlling means comprising
      storing means for storing information indicating a relation between a load value of said fuel cell and a heat quantity recovered by said heat load from said fuel cell, and
      calculating means for calculating electric power to be consumed by said heat generating means based on the relation stored in said storing means, so that the sum of heat quantities recovered by said heat load from waste heat of said fuel cell and from generated heat of said heat generating means is a predetermined value, in response to said external electric power load being a small load value and a heat quantity recovered by said heat load from said fuel cell being less than the predetermined value.

6. The cogeneration system according to claim 5, wherein said controlling means comprises voltage regulating means for regulating a voltage applied from said fuel cell to said heat generating means according to a calculated result of said calculating means.

7. The cogeneration system according to claim 5, wherein said fuel cell comprises a heat exchanger for cooling water for supplying said heat load with heat of cooling water heated by a cell body.

8. The cogeneration system according to claim 5, wherein said fuel cell comprises a heat exchanger for exhaust gas for supplying said heat load with heat energy of steam or hot water heated by a gas reformer.

* * * * *